July 14, 1959   J. E. TAUNT   2,895,106
TESTER
Filed April 29, 1958   4 Sheets-Sheet 1
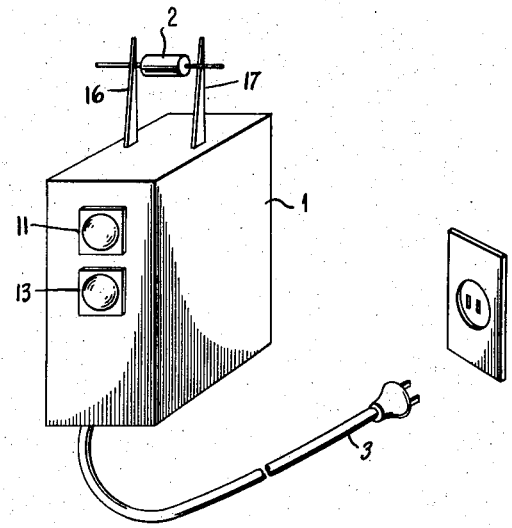
FIG. 1
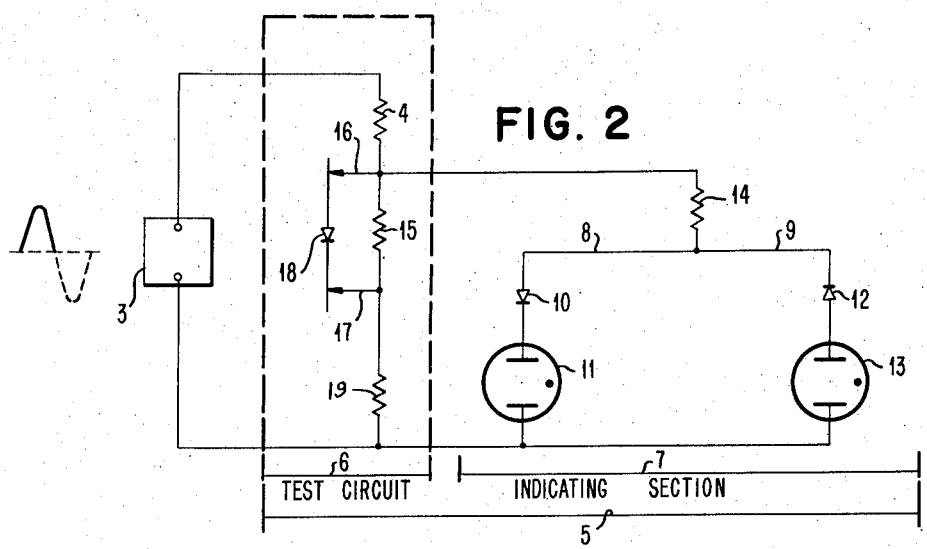
FIG. 2
FIG. 3
| STATE OF TEST DIODE | NEON 11 | NEON 13 |
|---|---|---|
| OPEN | ☼ | ☼ |
| SHORTED | ▦ | ▦ |
| GOOD (AS SHOWN) | ▦ | ☼ |
| GOOD (REVERSED POLARITY) | ☼ | ▦ |
INVENTOR.
JAMES E. TAUNT
BY Geoffrey Knight
ATTORNEY

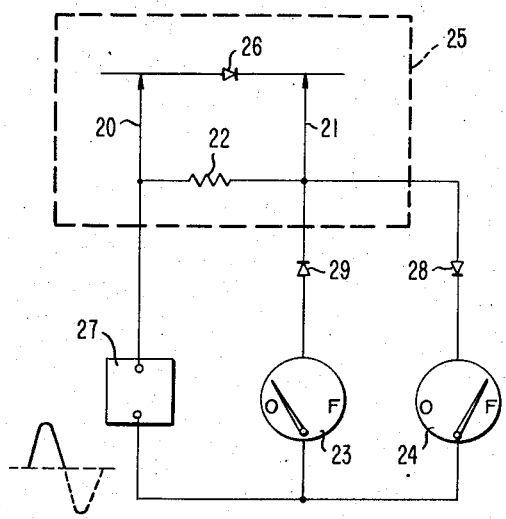
FIG. 4
| STATE OF TEST DIODE | METER 23 | METER 24 |
|---|---|---|
| OPEN | 0 | 0 |
| SHORTED | F | F |
| GOOD (AS SHOWN) | 0 | F |
| GOOD (REVERSED POLARITY) | F | 0 |
FIG. 5
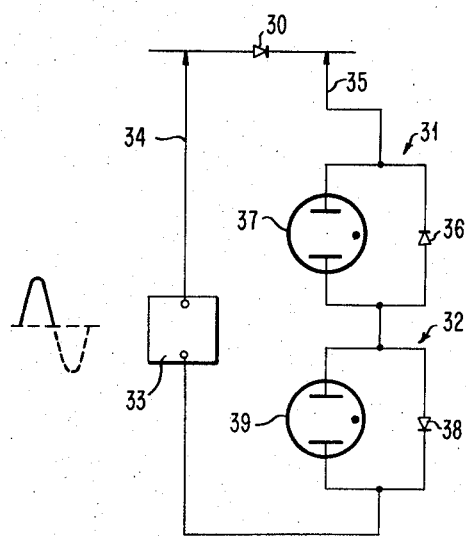
FIG. 6
| STATE OF TEST DIODE | NEON 39 | NEON 37 |
|---|---|---|
| OPEN | ▦ | ▦ |
| SHORTED | ☼ | ☼ |
| GOOD (AS SHOWN) | ▦ | ☼ |
| GOOD (REVERSED POLARITY) | ☼ | ▦ |
FIG. 7
INVENTOR.
JAMES E. TAUNT
BY Geoffrey Knight
ATTORNEY

| STATE OF TEST TRANSISTOR | | | STATE OF INDICATORS | | | | RESULT |
|---|---|---|---|---|---|---|---|
| C-B JUNCTION | B-E JUNCTION | TYPE | 46 | 48 | 50 | 52 | |
| O.K. | O.K. | P.N.P. | ☀ | ▦ | ▦ | ☀ | O.K. |
| O.K. | O.K. | N.P.N. | ▦ | ☀ | ☀ | ▦ | O.K. |
| SHORT | SHORT | ALL | ☀ | ☀ | ☀ | ☀ | BAD |
| OPEN | SHORT | ALL | ▦ | ▦ | ☀ | ☀ | BAD |
| O.K. | SHORT | N.P.N. | ▦ | ☀ | ☀ | ☀ | BAD |
| SHORT | OPEN | ALL | ☀ | ☀ | ▦ | ▦ | BAD |
| OPEN | OPEN | ALL | ▦ | ▦ | ▦ | ▦ | BAD |
| O.K. | OPEN | N.P.N. | ▦ | ☀ | ▦ | ▦ | BAD |

INVENTOR.
JAMES E. TAUNT
BY Geoffrey Knight
ATTORNEY

| STATE OF TEST TRANSISTOR | | | STATE OF INDICATORS | | | | RESULT |
|---|---|---|---|---|---|---|---|
| C-B JUNCTION | B-E JUNCTION | TYPE | 62 | 64 | 66 | 68 | |
| O.K. | O.K. | P.N.P. | ▦ | ☀ | ☀ | ▦ | O.K. |
| O.K. | O.K. | N.P.N. | ☀ | ▦ | ▦ | ☀ | O.K. |
| SHORT | SHORT | ALL | ▦ | ▦ | ▦ | ▦ | BAD |
| OPEN | SHORT | ALL | ☀ | ☀ | ▦ | ▦ | BAD |
| O.K. | SHORT | N.P.N. | ☀ | ▦ | ▦ | ▦ | BAD |
| OPEN | OPEN | ALL | ☀ | ☀ | ☀ | ☀ | BAD |
| O.K. | OPEN | N.P.N. | ☀ | ▦ | ☀ | ☀ | BAD |

*INVENTOR.*
JAMES E. TAUNT
BY *Geoffrey Knight*
*ATTORNEY*

United States Patent Office

2,895,106
Patented July 14, 1959

2,895,106
TESTER

James E. Taunt, Poughkeepsie, N.Y., assignor to International Business Machines Corporation, New York, N.Y., a corporation of New York Application April 29, 1958, Serial No. 731,794

8 Claims. (Cl. 324—158)

This invention relates to electrical test equipment and particularly to a device for testing conductivity of components which may present different resistances to different polarities of voltage.

In testing of crystal diodes, rectifiers, and other components having unidirectional conductive characteristics between two elements, it has been customary to first measure conductivity in one direction, and then to reverse the leads for a test of conductivity in the reverse direction. Two readings were required. This process, if repeated, tended to cause human errors due to skipping an element or forgetting the first reading, and the necessary manipulation of test leads increased the likelihood of shorting out circuit elements with a test probe.

It is, therefore, an object of the invention to provide at a single reading a complete test of the component for shorts, opens and unidirectional conductivity.

It is a further object of the invention to provide a small lightweight tester which is inexpensive, convenient to use and foolproof since with a preferred embodiment the technician can observe complete test results without moving his hands or turning his eyes away from the component.

Another object of the invention is to provide in one reading a full test for shorts, opens, or unidirectional conductivity and polarity, under operating conditions of current and voltage, without subjecting the component under test to currents or voltage of a magnitude sufficient to damage the device.

Another object of the invention is to eliminate the false readings caused by normal unidirectional conductivity when vacuum tubes and the like are tested for shorts.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a perspective view of the tester.

Fig. 2 is a schematic electrical diagram of one embodiment of the invention.

Fig. 3 is a chart of test results associated with the embodiment of Fig. 2.

Fig. 4 is a schematic electrical diagram of a second embodiment of the invention.

Fig. 5 is a chart of test results for Fig. 4.

Fig. 6 is a schematic electrical diagram of a third embodiment of the invention.

Fig. 7 is a chart of test results for Fig. 4.

Figures 8, 9:
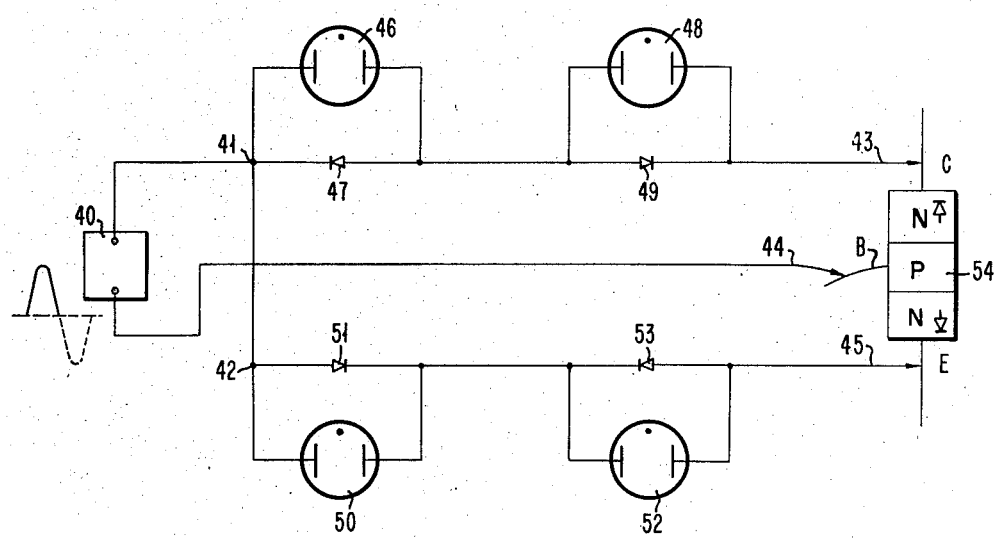
Fig. 8 is a schematic diagram of a fourth embodiment of the invention.
Fig. 9 is a chart of test results for Fig. 8.

In a preferred embodiment shown in Fig. 1, and shown schematically in Fig. 2, the tester is designed to indicate at a glance, by the following patterns of its neon indicator lamps, the following four states of the device under test:

(1) Both neons on—open.
(2) Both neons off—shorted.
(3) First neon off and the second on—rectifier of one polarity—good.
(4) First neon on and the second off—rectifier of the other polarity—good.

In operation, the tester 1 (Fig. 1) is plugged into an alternating current source and the test probes placed across the device 2 under test; in Fig. 2, current path is from one side of power source 3, through a series resistor 4, one or more branches of the parallel circuit 5 of three branches and back to the other side of the power source. Parallel circuit 5 comprises a test circuit 6 and an indicating section 7 of two groups 8—9:

Indicating group 8—rectifier 10 and neon 11 in series.
Indicating group 9—rectifier 12 and neon 13 in series.

The two indicating groups share a limiting resistor 14 and are oppositely polarized by the rectifiers.

Test circuit 6—resistor 15, which is shunted by test probes 16—17 through the component under test (shown as a test diode 18 in Fig. 2); limiting resistor 19 in series. The test circuit is a resistance divider with the test diode as a control.

On a positive half cycle, the resistance of the test circuit will be low if the test diode is shorted or conducting for the particular half cycle, as shown in Fig. 2, since test diode 18 and test probes 16 and 17 form a low resistance shunt around resistor 15. If the test diode is open or nonconducting, the resistance of the test circuit is high. If the test diode is shorted, or conducting for the particular half cycle, the current through the load resistor 4 and the test circuit encounters a low resistance and increases. The resistance of the load resistor being unchanged, the higher current causes a greater IR drop across the load resistor, which lowers the potential available to the indicating section to a value not sufficient to fire the neons in the indicating section. The neon in indicating group 9 can never fire on the positive half cycle because of the high back resistance of its rectifier.

As the voltage swings negative, the action will be the same if the test diode is shorted, and neither neon will fire, since resistor 15 is shunted by a low-resistance path through the test diode, placing the test circuit at a position on the voltage divider 4, 19 where voltage is too low to fire the neons. If the test diode of Fig. 2 is "good," it will be opposing current in the shunt 16, 18, 17 around resistor 15, and indicating group 9, neon 13 will fire, because there will be normal resistance in the test circuit, normal IR drop across the load resistor, and sufficient potential available at the indicating section to fire the neons. Neon 13 will fire, but the negative current to neon 11 will be blocked by the related rectifier 10.

If the test diode is open, there will never be a shunt around resistor 15 in the test circuit. There will always be normal resistance in the test circuit, normal IR drop across the load resistor, and sufficient potential available to fire each neon on alternate half cycles. Both will appear lighted to the eye.

In a second embodiment as shown in Fig. 4, the test circuit comprises test probes 20—21 and a series resistor 22, which is shunted by the component being tested. Galvanometers 23—24 are used for indication; in Figs. 4 and 5, "F" indicates full scale deflection, and "0" indicates near zero.

On a positive half cycle, the resistance of the test circuit 25 will be low if the test diode 26 is "good," because of the low-impedance shunt through the test diode. Meter 24 will indicate the entire voltage of source 27, which rectifier 28 will pass with negligible IR drop; meter 23 will indicate near zero because of the high blocking resistance of its related rectifier 29.

On the negative half cycle, the resistance of the test circuit will be high, since the test diode does not provide a low-impedance shunt to negative potential. Almost all the source voltage will be dropped by resistor 22; rectifier 29 will pass the remainder but meter 23 will read near zero. Meter 24 will indicate near zero because of the high blocking resistance of its related rectifier 28.

If the test diode is shorted, there will be a permanent low-impedance shunt around resistor 22; meter 24 will indicate the full positive component of the voltage source which is passed by its related rectifier, and meter 23 will indicate the negative component.

Until the probes make contact with the test diode, or if the test diode is open there will never be a low-impedance shunt around resistor 22; almost all of the source voltage will be dropped by resistor 22, causing both meters to indicate near zero.

Figs. 6 and 7 show a third embodiment and the related results. This embodiment displays a variation of the test circuit in which the test diode 30 is connected in series instead of as a shunt for a series resistor, and of the indicating groups 31—32 which are in series with the voltage source 33 and the test diode, through test probes 34—35.

On a positive half cycle, the resistance of the test circuit will be low, because the test diode conducts, and the full source voltage will be applied to group 31. Rectifier 36 opposes positive voltage; there will be no low-impedance shunt around neon 37, which will fire. Rectifier 38 provides a low-impedance shunt around neon 39, which will not fire because there is no difference of potential at its two electrodes.

On a negative half cycle, the test circuit presents high resistance, because the test diode opposes current; the negative pulse will not be passed to fire either neon.

If the test diode is open, there will be an open series circuit, and neither neon will fire.

If the test diode is shorted, it will pass both negative and positive voltages, sufficient to fire on alternate half cycles the neon which is not shunted by a low-impedance path. Both will appear lighter to the eye, if the source voltage is 60 cycle A.C.

Fig. 8 illustrates an embodiment for testing transistors; Fig. 9 is a partial chart of test results. Power supply 40 is connected to binders 41—42, and provides voltage across test probes 43—44 and 44—45. Indicator neon 46, shunted by rectifier 47, is in series with neon 48 and its related shunt rectifier 49, to form the indicating section for one junction of the component under test. Indicator neon 50, with its shunt rectifier 51, and neon 52, with its shunt rectifier 53, form the indicating section for the other junction of test transistor 54.

On a positive half cycle, during testing of a good NPN transistor, both junctions (Fig. 8) oppose, effectively opening the test circuit. No neons fire.

When the voltage swings negative, the action is reversed. Neon 46 is short-circuited through rectifier 47, neon 48, which fires, and the C–B junction. Neon 50 fires through rectifier 53 (shorting neon 52) and the B–E junction.

If one junction of the test transistor is shorted, both of the related indicators will operate, on alternate half cycles. (Neons 46 and 48 will fire in Fig. 8 if the C–B junction is shorted.)

If one junction of the test transistor is open, neither of its associated indicators will operate.

Fig. 9 shows a partial set of test results. If the test transistor is OK, two neons will fire, one for each junction; the type of transistor will be apparent from the pattern of neons. Most faulty transistors will be detected by a count of neons other than two; transistors with one shorted junction and one open junction will be detected by two lighted neons for one junction.

Figures 10, 11:
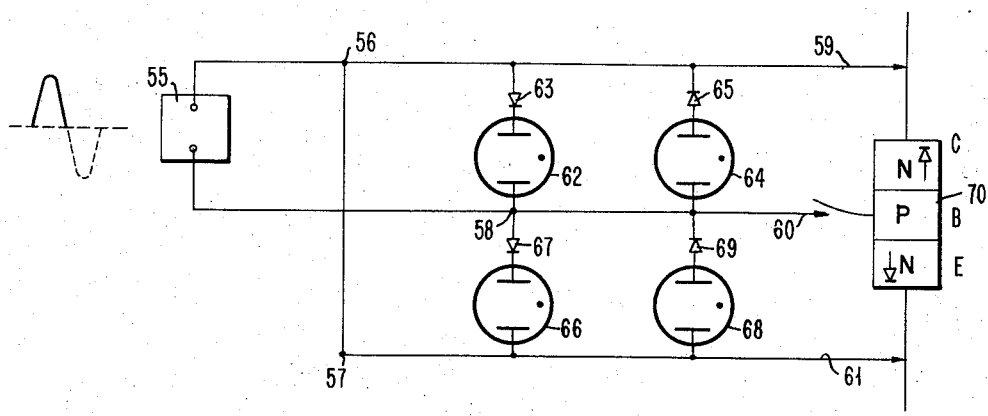
Fig. 10 is a schematic diagram of a fifth embodiment of the invention.
Fig. 11 is a chart of test results for Fig. 10.

Fig. 10 illustrates an additional embodiment for testing transistors. Power supply 55 is connected to points 56—57, provides voltages across test probes 59—60, and 60—61.

On a positive half cycle, during testing of a good NPN transistor, both junctions are reverse biased and appear open. Neon 62 will fire as it measures the voltage across the C–B junction, which is passed by rectifier 63. Neon 64 will not fire because of the high back resistance of rectifier 65. Neon 68 will fire as it measures the voltage across the B–E junction, passed by rectifier 69.

When the voltage swings negative, both junctions conduct, short circuiting all the indicators.

Limiting resistors have been omitted in the embodiments shown in Figs. 4, 6, 8 and 10, for clarity in explaining the invention. They should be sufficiently large to prevent burning out the indicators chosen for any particular embodiment of the invention. Neons, meters, filamented lamps, or any other electrically operated indicator may be used.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a tester for electrical components which may exhibit rectifier characteristics; an A.C. power source; test circuit means including means for connecting a component to said power source whereby the voltage between elements of said test circuit means is affected by the conductivity between elements of said component for the instantaneous direction of voltage of said power source; and means forming paired indicating circuit groups connected to said test circuit means, each group comprising a rectifier and a voltage indicator, said paired groups being adapted by electrical orientation of said rectifiers to operate on alternate directions of voltage of said power source.

2. A circuit for testing electrical components comprising an A.C. power supply, means forming paired indicating circuit groups, each comprising a voltage indicating device and a rectifier, said rectifiers being electrically inverted relative to each other; and test circuit means including leads for connection to the component being tested, said test circuit means being connected to said power supply and said indicating circuit groups in such manner as to make the voltage applied across said indicating circuit groups dependent upon the instantaneous direction of the power supply voltage and upon the conductivity, in the corresponding sense, of the component being tested.

3. In an apparatus for testing electrical components which may exhibit rectifier characteristics: an A.C. power source; test circuit means comprising a resistor and means for connecting the component being tested in shunt across said resistor to said power source, whereby the voltage across said resistor is affected by the conductivity of said component for the instantaneous direction of current; and means forming a pair of indicating paths connected to said test circuit means, each path comprising a rectifier and a voltage operated indicating device electrically connected as a group, the rectifiers being relatively inverted electrically.

4. An apparatus according to claim 3, wherein said indicating paths are connected in parallel with said test circuit means in such manner that one indicating branch operates to indicate conductivity in one direction of the aforesaid component being tested on positive half cycles of said power source, and the other branch operates to indicate conductivity in the opposite direction of said component on negative half cycles.

5. In a device for testing transistors: an A.C. power source, test circuit means including leads for connecting the test transistor to said power source whereby the voltage between elements of said test circuit means is affected by the conductivity between elements of said test transistor for the instantaneous direction of voltage of said power source; and means forming a plurality of pairs of indicating groups connected to said test circuit means, each group comprising a rectifier and a voltage indicator, said paired groups being adapted by electrical orientation of said rectifiers to operate on alternate directions of voltage of said power source.

6. In a tester for transistors: an A.C. power source; means forming two pairs of indicating groups, each group comprising a rectifier and an indicator, said rectifiers in each pair being relatively inverted, and electrically connected in series with each other; and means forming a test circuit for connecting one junction of the test transistor in series with one of said pairs of indicating groups, and another junction similarly in series with the other pair of indicating groups; said test circuit means being connected to said power source in such manner as to make the voltage applied across said indicating circuit groups dependent upon the instantaneous direction of said A.C. power source and upon the conductivity in the corresponding sense, of particular junctions of the test transistor.

7. A device for testing electrical components comprising an A.C. power cord, means for forming paired indicating circuit groups, each comprising a voltage indicating lamp and a rectifier, said rectifiers being electrically inverted relative to each other; and test circuit means including leads for connection to the component being tested, said test circuit means being connected to said power supply and to said indicating circuit groups in such manner as to make the voltage applied across said indicating circuit groups dependent upon the instantaneous direction of the power supply voltage and upon the conductivity, in the corresponding sense, of the component being tested, and said voltage indicating devices being located proximately to said leads; whereby said indicating devices exhibit, by a composite of their values, multiple characteristics of the component being tested, including at least shorted, open, and unidirectionally conductive together with polarity.

8. In a tester for electrical components which may exhibit rectifier characteristics; an A.C. power source; test circuit means including means for connecting a component to said power source whereby the voltage between elements of said test circuit means is affected by the conductivity between elements of said component for the instantaneous direction of voltage of said power source; and means forming paired indicating circuit groups connected to said test circuit means, each group comprising a rectifier and an on-off voltage indicator, said paired groups being adapted by electrical orientation of said rectifiers to operate in alternate directions of voltage of said power source, and said indicators being adapted to exhibit, by a composite pattern of on and off values, multiple characteristics of the component being tested, including shorted, open, unidirectionally conductive and polarity.

References Cited in the file of this patent

UNITED STATES PATENTS

| | | |
|---|---|---|
| 2,776,407 | Halverson | Jan. 1, 1957 |
| 2,822,518 | Jordan | Feb. 4, 1958 |